United States Patent [19]

Tünker

[11] Patent Number: 5,443,669
[45] Date of Patent: Aug. 22, 1995

[54] PROCESS FOR PRODUCING A LAMINATED GLASS PANE, ESPECIALLY FOR A MOTOR VEHICLE

[75] Inventor: Gerhard Tünker, Duisburg, Germany

[73] Assignee: Flachglas Aktiengesellschaft, Furth, Germany

[21] Appl. No.: 291,743

[22] Filed: Aug. 17, 1994

Related U.S. Application Data

[63] Continuation of Ser. No. 950,798, Sep. 24, 1992, abandoned.

[30] Foreign Application Priority Data

Oct. 1, 1991 [DE] Germany .................. 41 32 652.0

[51] Int. Cl.⁶ ................ B32B 31/20; C03C 8/16; C03C 27/12
[52] U.S. Cl. .................. 156/102; 156/103; 156/106; 65/60.3; 65/106; 428/426; 501/17; 501/20
[58] Field of Search .......... 156/102, 103, 106; 65/60.3, 106, 107; 501/17, 20; 428/426

[56] References Cited

U.S. PATENT DOCUMENTS 4,959,090  9/1990  Reinherz .................. 65/60.4
5,093,285  3/1992  Murkens .................. 501/17

Primary Examiner—Michael W. Ball
Assistant Examiner—Francis J. Lorin
Attorney, Agent, or Firm—Herbert Dubno

[57] ABSTRACT

In the production of a glass laminate wherein two panes are subjected to deformation with single or double curvature, a screen-printed pattern on at least one of the panes is dried by heating below 300° C. to evaporate the printing oil before the panes are stacked for deformation and simultaneously baking on the dry enamel pattern. The panes are then separated, a plastic sheet interposed and the resulting stack is bonded to form the laminate.

14 Claims, 1 Drawing Sheet

PROCESS FOR PRODUCING A LAMINATED GLASS PANE, ESPECIALLY FOR A MOTOR VEHICLE

This is a continuation of application Ser. No. 07/950,798 filed on 24 Sep. 1992 now abandoned.

FIELD OF THE INVENTION

My present invention relates to a process for producing a laminated glass pane with single or double curvature, especially for a motor vehicle and, more particularly, for producing a glass pane having a printed pattern, especially for a motor vehicle windshield where that pattern can be a border.

BACKGROUND OF THE INVENTION

In the fabrication of safety glass for automotive windshields and the like, it is known to sandwich a thermoplastic layer, hereinafter referred to as a plastic sheet, between two singly-curved or doubly-curved glass panes, and to bond the resulting stack into a composite or laminate.

The reference to single curvature here is to curvature in one plane and a reference to double curvature is a reference to curvature in two mutually-perpendicular planes.

The laminate can have, therefore, a glass outer pane, a glass inner pane and a plastic sheet between the two panes forming an interlayer.

It is common to provide a coating by a screen-printing process, e.g. to the surface of the outer pane facing the plastic sheet, of a conductive or nonconductive material. For example, when an edge pattern of the printing is provided, the edge coating can be used to obscure other components of the motor vehicle. It can also take the form of a printed antenna, if it is conductive, or can be a heating element operating by resistance heating.

The coating, regardless of its purpose and utility, has exacting requirements. It must satisfactorily survive the statistical service life of the laminate and neither discolor nor detach. The coating must be clearly defined, i.e. the printed borders must be maintained and not run. The coating must provide a uniform covering, free from blisters and gas bubbles or inclusions and provide an overall favorable appearance.

Printed coatings of this type, composed of enamel inks and applied by screen printing, have in the past met many of these requirements, but almost invariably have required an elaborate process for producing a single or double curvature.

The production of a laminate with single or double curvature may use the following known processes. Two panes which are to form the inner and outer panes of the laminate are placed one on top of the other and heated to a deformation temperature to bend the pair of plates to the single or double curvature as required. The curved panes are then removed from one another, the plastic sheet placed between them and the stack with the plastic sheet interposed is heated to form the laminate.

This process is, by and large, satisfactory and, since plates conform in configuration to one another, they have the same curvature and, apart from negligible tolerances, are largely free from optical distortion. In the past, however, when a screen-printing process was used to apply a standard enamel ink, this approach could not be employed.

The enamel ink, which could include ethyl cellulose as an organic vehicle, was applied to the flat uncurved glass pane and baked thereon at a temperature of say 555° C.

The two panes, both of which have baked on coatings, can then be placed one upon the other and heated to deformation temperature to impart the single or double curvature thereto. The process then continued as described above, i.e. the panes were separated, the plastic sheet interposed and the stack heated to form the laminate.

In this process, however, the baking step interfered with the process line for producing the laminate and involved a costly procedure which was not readily integratable into the standard production line for producing laminates. The baking process moreover, when carried out with the planar glass panes, introduced deformation with optical faults. These optical faults remained pairing of the glass panes and bending to single or double curvature.

When efforts were made to eliminate the prebaking, the adhesion of the enamel ink was found to be inadequate and blistering of the enamel coating was observed.

OBJECTS OF THE INVENTION

It is, therefore, the principal object of the present invention to provide a process for producing a single or double-curved laminate with a screen-printed pattern whereby these drawbacks are avoided.

It is another object of the invention to provide a process for producing such laminates which have uniform screen-printed patterns and yet high optical quality without material interruption of the standard lines for producing automotive windshields, for example, and at a limited increase in cost over the production of windshields without screen-printed patterns.

SUMMARY OF THE INVENTION

These objects are attained, in accordance with the invention, by utilizing a unique screen-printable enamel ink and, subsequent to screen printing of that ink on the surface of a glass pane, e.g. the outer glass pane of a windshield adapted to be turned toward the plastic sheet, the screen printing is subjected to heating at a temperature sufficient to volatilize the screen-printing oil included in the enamel ink, before stacking of the panes for paired deformation, the deformation heating serving to thereafter bake on the printed coating.

The process of the invention thus comprises the steps of:

(a) forming a screen-printable enamel ink consisting essentially of a glass-flux paste, at least one ceramic pigment, an inorganic binder and an organic screen-printing oil;

(b) screen-printing the enamel ink in a predetermined pattern on one side of a first flat glass pane;

(c) drying the ink in the pattern at a temperature at which the screen-printing oil is volatile to evaporate the screen-printing oil from the ink in the pattern and dry the pattern;

(d) placing the pane with the dry pattern and at least one other glass pane on top of one another to produce a paired stack of the panes and bending the stack with at least a single curvature at a pane-deformation temperature sufficient to effect bending of the panes and baking the dry pattern on the one of the panes simultaneously with the bending to produce curved panes in the stack;

(e) separating the curved panes from one another;

(f) interposing between the separated panes a plastic sheet bondable to the panes and forming another stack of the panes with the plastic sheet between them; and (g) heating the other stack to bond the panes and the plastic sheet into the curved glass laminate.

The process can thus be integrated without difficulty in existing production lines for laminated glass panes.

The drying of the coating can be carried out continuously along the standard production line which must be traversed by the glass pane in any event. The drying can be carried out with infrared radiation. Surprisingly, the coating adheres adequately after drying so that the deformation step can be effected to simultaneously bake on the coating without the danger of blistering or running of the coating. It appears that the fact that the dried coating is trapped between the panes in stacking for the deformation guarantees that there will be no defects in the coating by running, gas release or the like. The baked-on coating meets all of the requirements outlined above including those relating to long-term behavior.

According to a feature of the invention, the enamel ink includes at least one silica gel as the inorganic binder or a part thereof. The term "silica gel" is here used to include silica gel itself and modifications thereof. The silica gel may, therefore, be selected from the group which consists of:

tetramethylorthosilicate,
tetraethylorthosilicate,
tetra-n-propylsilicate,
tetramethylglycolsilicate,
ethylpolysilicate,
silicic-acid esters,
ethylglycol-free silicic acid binders,
modified silicic acid esters,
butylglycolsilicate, and
mixtures thereof.

According to a feature of the invention, the inorganic binder forming component also includes at least one metal alcoholate, preferably a metal alcoholate selected from the group which consists of aluminum, titanium, zirconium or boron alcoholates.

It has been found, moreover, that addition of an oxygen-releasing agent may help reduce gas evolution and eliminate it during the baking-on portion of the process and, to that end, I may add to the inorganic binder at least one inorganic oxygen source, for example lead dioxide, red lead (minium), manganese oxide or a mixture thereof.

The screen-printing oil is preferably a glycol, especially ethyleneglycol, or terpine oil.

The enamel ink which is used, according to the invention, can contain 40 to 80% by weight of a glass paste or flux, i.e. a paste which when heating to the deformation temperature, turns into molten glass and preferably an amount of approximately 50% by weight of the glass paste. The enamel ink can contain 20 to 60% by weight, preferably 30% by weight, of the ceramic pigment.

The deformation temperature can be adjusted so that both deformation and baking of the screen-printed pattern can be effected in the deformation step and the drying is preferably carried out at a temperature below 300° C. with the aid of infrared heating.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
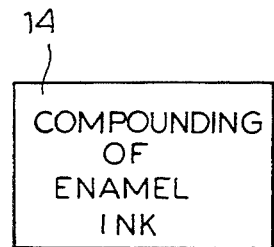
FIG. 1 is a diagram illustrating a first stage as the process of the invention.
Figure 2:
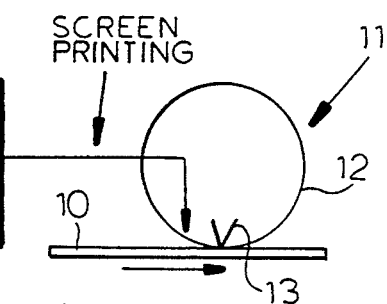
FIG. 2 is a diagram illustrating a second stage thereof.
Figure 3:
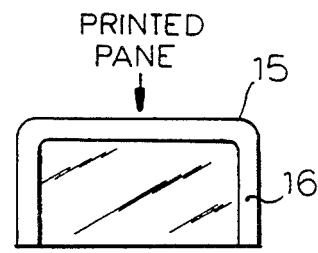
FIG. 3 is a diagram illustrating the drying step.
Figure 5:
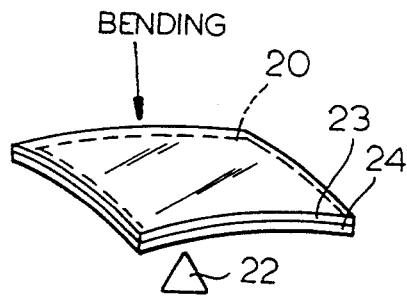
FIG. 5 is a diagram illustrating the bending step.
Figure 4:
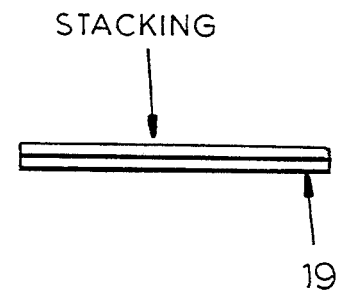
FIG. 4 is a diagram illustrating the stacking step.
Figure 6:
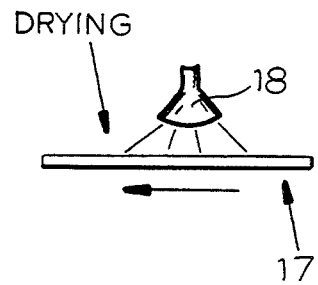
FIG. 6 is a diagram illustrating the laminating step.
Figure 7:
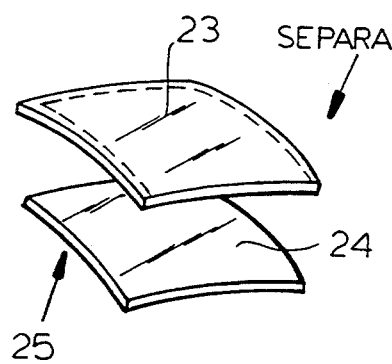
FIG. 7 is a diagram illustrating the separating step.
Figure 8:
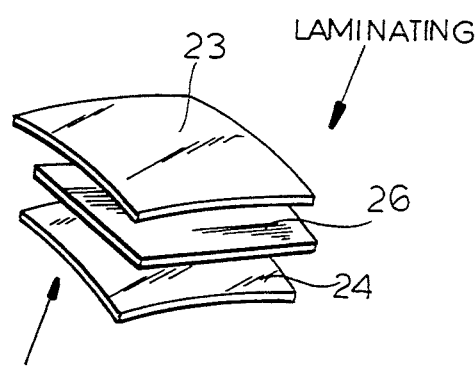
FIG. 8 is a diagram illustrating the final fusion step.

As can be seen from the drawing, a flat glass plane 10 is subjected to screen printing at 11 by a silk-screen drum 12 and wiper or doctor blade 13 with an enamel ink formed in an enamel ink compounding step 14.

The screen-printed pane 15 is shown to have a screen-printed border 16 which is dried at 17 by subjecting this pane 15 to infrared radiation from an infrared heater 18 at a temperature below 300° C.

Two such panes are then stacked at 19 and the stacked panes with the dried pattern represented at 20 are subjected to bending at 21. In this stage, a source of deformation heat is represented at 22 and bending can be effected in any standard bending mold or frame and, in the illustrated embodiment is shown to result in a pair of panes 23 and 24 with double curvature. The panes 23 and 24 are then separated at 25 and a plastic sheet 26 is interposed between the panes 23 and 24 at 27.

The resulting stack is fused to form the ultimate laminate 30 in a fusion step 29.

SPECIFIC EXAMPLE

For manufacture of a laminated glass pane with single curvature in the form of a windshield of a motor vehicle with printed-edge coating, I proceeded as follows for test purposes:

1. Using a commercially-available screen powder pigment for laminated glass, three screen-printable enamel inks were prepared in paste form with different screen-printing oils, that is to say, in accordance with the following Table:

| Proportions in weight % | A | B | C |
| --- | --- | --- | --- |
| Glass paste (lead borosilicate) | 50 | 50 | 50 |
| Pigment (copper chrome spinel) | 28 | 28 | 28 |
| Terpineol | 18 | 22 | 18 |
| Ethyl cellulose | 4 | — | — |
| Silicate vehicle | — | — | 4 |

2. A 5 cm wide all-round ornamental strip with a layer thickness of 10–15 μm was applied to three flat windshields with the individual enamel inks with the aid of a 77 threads/cm polyester screen.

3. The coating in accordance with 2. was dried with the aid of infrared radiation, a temperature of approximately 250° C. being measured on the glass pane in the drying area. Escape of vapor of the screen-printing oils was observed. Drying was carried out until no further evaporation of screen-printing oil was perceptible.

After cooling of the panes, the adhesion of the enamel inks was checked by sticking on adhesive strips and pulling the adhesive strips off. Enamel inks A and C adhered well. They could not be removed with the adhesive strips. Enamel ink B evidenced no adhesion and remained almost completely on the adhesive strip.

4. The glass panes prepared in accordance with 3. were each placed together with a second unprinted glass pane, heated over 8 minutes to a temperature of 620° C., held at this temperature for a period of one minute and then bent at this temperature with the usual equipment. After the curved pairs of panes had cooled down, the second pane was lifted off. The quality of the baked-on enamel inks was assessed by visual inspection and by examination for adhesion:

Ink A evidenced inadmissibly pronounced variations of hue, pores and bonding to the mating pane.

Ink B evidenced uniform hue, but inadmissible pores and bonding to the mating pane. The outlines were indistinct.

Ink C evidenced an enamel layer of faultless density, no undesirable pores and no bonding to the mating pane.

5. The treated glass panes bent in accordance with 4. were combined as usual to form a laminated glass pane and their long-term behavior was examined by simulation.

The examination results have been recorded in the following table:

| Ink | A | B | C |
| --- | --- | --- | --- |
| Storage in water bath weeks 20° C. | negative | negative | positive |
| Storage at 100° C.C/1 h in air | negative | negative | positive |
| Storage at 100° C.C/1 h in water bath | negative | negative | positive |

In the case of Inks A and B, inadmissible defects were found in the plastic sheet interlayer after the tests for long-term behavior, e.g. moisture pick-up and blistering. The panes to which a coating had been applied with Ink C were free from defects after the tests.

I claim:

1. A process for producing a curved glass laminate, comprising the steps of:
    (a) forming a screen-printable enamel ink consisting essentially of a glass-flux paste, at least one ceramic pigment, a binder forming component and an organic screen-printing oil volatile at a temperature below 300° C.;
    (b) screen-printing said enamel ink in a predetermined pattern on one side of a first flat glass pane;
    (c) drying said ink in said pattern at a drying temperature at which said screen-printing oil is volatile and below 300° C. to evaporate said screen-printing oil from the ink in said pattern and dry said pattern without firing of said enamel ink;
    (d) placing said pane with the dry pattern and another glass pane on top of one another with said other glass pane lying against said one side to produce a paired stack of said panes and heating said stack to a temperature sufficient to soften the glass of said panes, and bending said stack with at least a single curvature at a pane-deformation temperature sufficient to effect bending of said panes and baking of the dry pattern only on said one side of said first pane simultaneously with the bending to produce curved panes in said stack;
    (e) separating said curved panes from one another;
    (f) interposing between the separated panes a plastic sheet bondable to said panes and forming another stack of said panes with said plastic sheet between them; and
    (g) heating said other stack to simultaneously bend said panes and said plastic sheet to effect a double curvature and to bond said other stack together into said curved glass laminate.

2. The process defined in claim 1 wherein said curved glass laminate is an automotive windshield and said first glass pane is an outer pane of said windshield and said pattern is screen printed on a surface of said outer pane facing said plastic sheet, said pattern being applied at least along an edge of the windshield.

3. The process defined in claim 2 wherein a respective said pattern is applied to each of said panes at surfaces thereof facing said plastic sheet.

4. The process defined in claim 2 wherein said binder-forming component includes a silica gel.

5. The process defined in claim 4 wherein said silica gel is selected from the group which consists of:
    tetramethylorthosilicate,
    tetraethylorthosilicate,
    tetra-n-propylsilicate,
    tetramethylglycolsilicate,
    ethylpolysilicate,
    silicic-acid esters,
    ethylglycol-free silicic acid binders,
    modified silicic acid esters,
    butylglycolsilicate, and
    mixtures thereof.

6. The process defined in claim 4 wherein said ink includes a metal alcoholate.

7. The process defined in claim 6 wherein said metal alcoholate is an alcoholate of aluminum, titanium, zirconium, boron or a mixture thereof.

8. The process defined in claim 4 wherein an inorganic source of oxygen is included in said ink.

9. The process defined in claim 8 wherein said source is selected from the group which consists of lead dioxide, minium (red lead), manganese oxide, and mixtures thereof.

10. The process defined in claim 4 wherein said screen-printing oil is selected from the group which consists of terpine oil, ethylene glycol and mixtures thereof.

11. The process defined in claim 10 wherein said screen-printing oil is terpine oil.

12. The process defined in claim 10 wherein said screen-printing oil is ethylene glycol.

13. An automotive windshield made by the process of claim 4.

14. A process for producing a curved glass laminate, comprising the steps of:
    (a) forming a screen-printable enamel ink consisting essentially of a glass-flux paste, at least ceramic pigment, a binder-forming component containing a metal alcoholate selected from the group which consists of aluminum, titanium, zirconium and boron alcoholates, and an organic screen-printing oil volatile at a temperature below 300° C. and selected from the group which consists of terpine oil, ethylene glycol and mixtures thereof;
    (b) screen-printing said enamel ink in a predetermined pattern on one side of a first flat glass pane;
    (c) drying said ink in said pattern at a drying temperature at which said screen-printing oil is volatile and below 300° C. to evaporate said screen-printing oil from the ink in said pattern and dry said pattern without firing of said enamel ink;

(d) placing said pane with the dry pattern and another glass pane on top of one another with said other glass pane lying against said one side to produce a paired stack of said panes and heating said stack to a temperature sufficient to soften the glass of said panes, and bending said stack with at least a single curvature at a pane-deformation temperature sufficient to effect bending of said panes and baking of the dry pattern on said one of said panes only simultaneously with the bending to produce curved panes in said stack;

(e) separating said curved panes from one another;

(f) interposing between the separated panes a plastic sheet bondable to said panes and forming another stack of said panes with said plastic sheet between them; and (g) heating said other stack to bond said panes and said plastic sheet into said curved glass laminate.

* * * * *